(12) United States Patent
Bernabe et al.

(10) Patent No.: US 11,740,420 B2
(45) Date of Patent: Aug. 29, 2023

(54) OPTOELECTRONIC DEVICE COMPRISING AN ACTIVE PHOTONIC INTERPOSER TO WHICH A MICROELECTRONIC CHIP AND AN ELECTRO-OPTICAL CONVERSION CHIP ARE CONNECTED

(71) Applicant: Commissariat à l'énergie atomique et aux énergies alternatives, Paris (FR)

(72) Inventors: Stéphane Bernabe, Grenoble (FR); Yvain Thonnart, Grenoble (FR); Jean Charbonnier, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 17/654,129

(22) Filed: Mar. 9, 2022

(65) Prior Publication Data

US 2022/0291465 A1    Sep. 15, 2022

(30) Foreign Application Priority Data

Mar. 11, 2021 (FR) .................................... 21 02420

(51) Int. Cl.
  *G02B 6/43*   (2006.01)
  *G02B 6/42*   (2006.01)
(52) U.S. Cl.
  CPC ............ *G02B 6/43* (2013.01); *G02B 6/4212* (2013.01)
(58) Field of Classification Search
  None
  See application file for complete search history.

(56) References Cited

U.S. PATENT DOCUMENTS 9,906,312 B2   2/2018   Kim
2018/0143374 A1 *   5/2018   Coolbaugh ............. H01L 23/13
(Continued)

FOREIGN PATENT DOCUMENTS

EP   2 874 334 A1   5/2015
EP   3 018 526 A1   5/2016
(Continued)

OTHER PUBLICATIONS

French Preliminary Search Report dated Nov. 24, 2021 in French Application 21 02420 filed on Mar. 11, 2021 therein 10 pages (with English Translation of Categories of Cited Documents & Written Opinion).

(Continued)

*Primary Examiner* — Jerry Rahll
(74) *Attorney, Agent, or Firm* — Oblon, McClelland, Maier & Neustadt, L.L.P.

(57) ABSTRACT

The invention relates to an optoelectronic device comprising a photonic interposer comprising: a photonic circuit containing at least one active optical component, an upper interconnect layer comprising at least one upper control portion, a lower interconnect layer comprising at least one lower control portion and lower intermediate portions, at least one TSV directly connecting the upper control portion to the lower control portion, conductive vias connecting the lower intermediate portions to the active optical component; at least one first microelectronic chip joined to the upper face of the photonic interposer; a second microelectronic chip joined to the lower face of the photonic interposer, and connected to the lower control portion and to the lower intermediate portions.

15 Claims, 7 Drawing Sheets

(56) References Cited

U.S. PATENT DOCUMENTS

| | | |
|---|---|---|
| 2019/0333905 A1 | 10/2019 | Raghunathan et al. |
| 2020/0003975 A1 | 1/2020 | Yu et al. |
| 2020/0219865 A1 | 7/2020 | Nelson et al. |

FOREIGN PATENT DOCUMENTS

| | | |
|---|---|---|
| EP | 3 059 622 A1 | 8/2016 |
| WO | WO 2018/098146 A1 | 5/2018 |
| WO | WO 2019/207363 A1 | 10/2019 |

OTHER PUBLICATIONS

Snyder et al., "Packaging and Assembly Challenges for 50G Silicon Photonics Interposers", 2018 Optical Fiber Communications Conference and Exposition, 2018, 3 pages.

Franke et al., "Electronic Module assembly", CIRP Annals-Manufacturing Technology, vol. 70, 2021, 23 pages.

Thonnart et al., "POPSTAR: a Robust Modular Optical NoC Architecture for Chiplet-based 3D Integrated Systems", Special Day on Silicon Photonics Paper, 2020, 6 pages.

\* cited by examiner

OPTOELECTRONIC DEVICE COMPRISING AN ACTIVE PHOTONIC INTERPOSER TO WHICH A MICROELECTRONIC CHIP AND AN ELECTRO-OPTICAL CONVERSION CHIP ARE CONNECTED

TECHNICAL FIELD

The field of the invention is that of optoelectronic devices comprising an active photonic interposer, that is to say an interposer comprising a photonic circuit with active optical components, and to which microelectronic chips are mechanically joined and electrically connected. The invention is applicable in particular in the field of high-performance computing.

PRIOR ART

Interposers are one-piece devices to which microelectronic chips are mechanically joined and electrically connected. Such chips may be CMOS integrated circuits, and may comprise electronic components such as transistors, resistors, capacitors, etc. They may be computing chips, memory chips, electro-optical conversion chips or the like. Such interposers may be produced based on silicon.

These interposers may be said to be photonic when they comprise a photonic circuit formed of passive optical components (waveguides, multiplexers, etc.) and possibly active optical components (modulators, diodes, etc.). It is known that an optical component is said to be active when it comprises at least one electrical terminal. When an active photonic interposer is involved, at least one electro-optical conversion microelectronic chip provides the electronic interface between another microelectronic chip and the active optical components.

The article by Thonnart et al. entitled *POPSTAR: a Robust Modular Optical NoC Architecture for Chiplet-based 3D Integrated Systems* describes one example of an optoelectronic device comprising a silicon-based active photonic interposer, through which there extends a photonic circuit comprising active optical components (modulators, filters or photodiodes). Computing chips and electro-optical conversion chips are joined and connected to the photonic interposer on the upper face thereof. However, there is a need to improve the performance of such an optoelectronic device.

DISCLOSURE OF THE INVENTION

One aim of the invention is to at least partially rectify the drawbacks of the prior art, and more particularly to propose an optoelectronic device, with an active photonic interposer, exhibiting improved performance.

To this end, one subject of the invention is an optoelectronic device comprising:
- a photonic interposer, having an upper face and an opposite, lower face, produced based on silicon, and comprising: a photonic circuit containing at least one active optical component, and an upper interconnect layer, defining the upper face, and comprising at least one first upper conductive control portion;
- at least one first microelectronic chip, joined to the upper face and connected to the first upper conductive control portion, intended to transmit or receive an electrical signal to or from a second microelectronic chip;
- the second microelectronic chip, called electro-optical conversion chip, joined and connected to the photonic interposer, which provides the electrical connection of the second microelectronic chip to the active optical component, on the one hand, and to the first microelectronic chip, on the other hand.

According to the invention, the photonic interposer comprises: a lower interconnect layer, defining the lower face, comprising at least one first lower conductive control portion, and first lower conductive intermediate portions; at least one through-silicon via directly connecting the first upper conductive control portion to the first lower conductive control portion; conductive vias connecting the first lower conductive intermediate portions to the active optical component. In addition, the second microelectronic chip is joined to the lower face, and is connected to the first lower conductive control portion, on the one hand, and to the first lower conductive intermediate portions, on the other hand.

Some preferred but non-limiting aspects of this optoelectronic device are as follows.

The photonic interposer may comprise a stack of layers, including a thick silicon layer and an optical layer in which the photonic circuit is formed, the thick silicon layer being situated towards the upper face and the optical layer being situated towards the lower face.

The photonic interposer may comprise a dielectric layer made of a silicon oxide, and situated between and in contact with the thick layer and the optical layer.

The photonic interposer may comprise first lower conductive power supply portions situated at the lower face and connected to an electric power source of the first microelectronic chip, and upper conductive power supply portions situated at the upper face and connected to the first lower conductive power supply portions by through-silicon vias. And the first microelectronic chip may comprise conductive power supply portions connected to the upper conductive power supply portions.

The photonic interposer may comprise second lower conductive power supply portions situated at the lower face and connected to an electric power source of the second microelectronic chip, and second conductive intermediate power supply portions situated at the lower face and connected to the second lower conductive power supply portions. And the second microelectronic chip may comprise conductive power supply portions connected to the second conductive intermediate power supply portions.

The photonic interposer may comprise one or more redistribution layers, comprising conductive lines and conductive vias, situated between and in contact with a lower dielectric layer and the lower interconnect layer, the redistribution layer providing the electrical connection between the second conductive intermediate power supply portions and the second lower conductive power supply portions.

The active optical component of the photonic circuit may be chosen from an optical modulator, an optical filter and a photodiode.

The optoelectronic device may comprise external waveguides optically coupled to the photonic circuit of the photonic interposer.

The optoelectronic device may comprise an encapsulating layer extending over the upper face of the photonic interposer and coming into contact with the first microelectronic chip.

The photonic interposer may have a thickness, between its lower and upper faces, of less than or equal to 200 μm.

The optoelectronic device may comprise a plurality of through-silicon vias directly connecting the first upper conductive control portion to the first lower conductive control portion, the first upper conductive control portions being connected to the first microelectronic chip by upper interconnect pads and the first lower conductive control portions being connected to the second microelectronic chip by lower interconnect pads, the upper interconnect pads and the lower interconnect pads being arranged with a pitch less than or equal to 40 µm.

The second microelectronic chip may be joined to the photonic interposer by way of lower interconnect pads, the latter being in contact with the second microelectronic chip and the photonic interposer.

The photonic interposer may rest on a power supply support by way of power supply pads whose thickness is greater than that of the second microelectronic chip.

The invention also relates to a method for manufacturing an optoelectronic device according to any one of the above features, comprising the following steps:

providing an SOI substrate, comprising a thick silicon layer, a dielectric layer made of a silicon oxide, and a thin silicon layer;
producing an optical layer from the thin silicon layer;
producing through-silicon vias, in blind openings extending through the optical layer, the dielectric layer, and through part of the thick silicon layer;
producing a lower dielectric layer extending over and in contact with the optical layer;
producing the lower interconnect layer on a lower dielectric layer;
joining a first handle substrate through direct bonding to the lower interconnect layer;
thinning the thick silicon layer, so as to open out the through-silicon vias;
producing the upper interconnect layer, in conductive portions in contact with the through-silicon vias;
removing the first handle substrate.

The manufacturing method may comprise the following steps:

before removing the first handle substrate, joining the first microelectronic chip to the upper interconnect layer, and depositing an encapsulating layer that covers the upper face;
joining a second handle substrate to a free planar face formed by the first microelectronic chip and the encapsulating layer, and removing the first handle substrate;
removing the second handle substrate;
joining the second microelectronic chip.

BRIEF DESCRIPTION OF THE DRAWINGS

Other aspects, aims, advantages and features of the invention will become more clearly apparent on reading the following detailed description of preferred embodiments thereof, this description being given by way of non-limiting example and with reference to the appended drawings, in which.

DETAILED DESCRIPTION OF PARTICULAR EMBODIMENTS

In the figures and in the remainder of the description, the same references have been used to designate identical or similar elements. In addition, the various elements are not shown to scale so as to improve the clarity of the figures. Moreover, the various embodiments and variants are not mutually exclusive and may be combined with one another. Unless otherwise indicated, the terms "substantially", "around" and "of" the order of mean to within 10%, and preferably to within 5%. Moreover, the terms "between . . . and . . . " and equivalents mean that the bounds are included, unless indicated otherwise.

Figure 1:
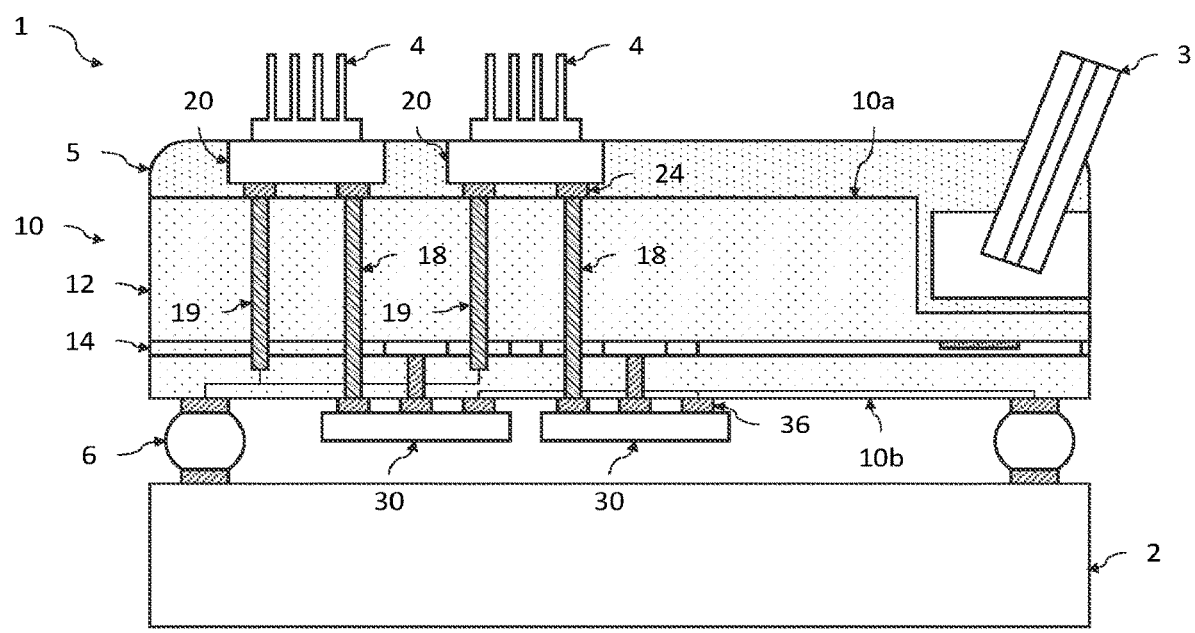
FIG. 1 is a schematic and partial cross-sectional view of an optoelectronic device comprising an active photonic interposer according to one embodiment.
Figure 1:
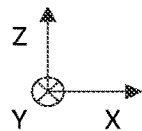
Figure 2:
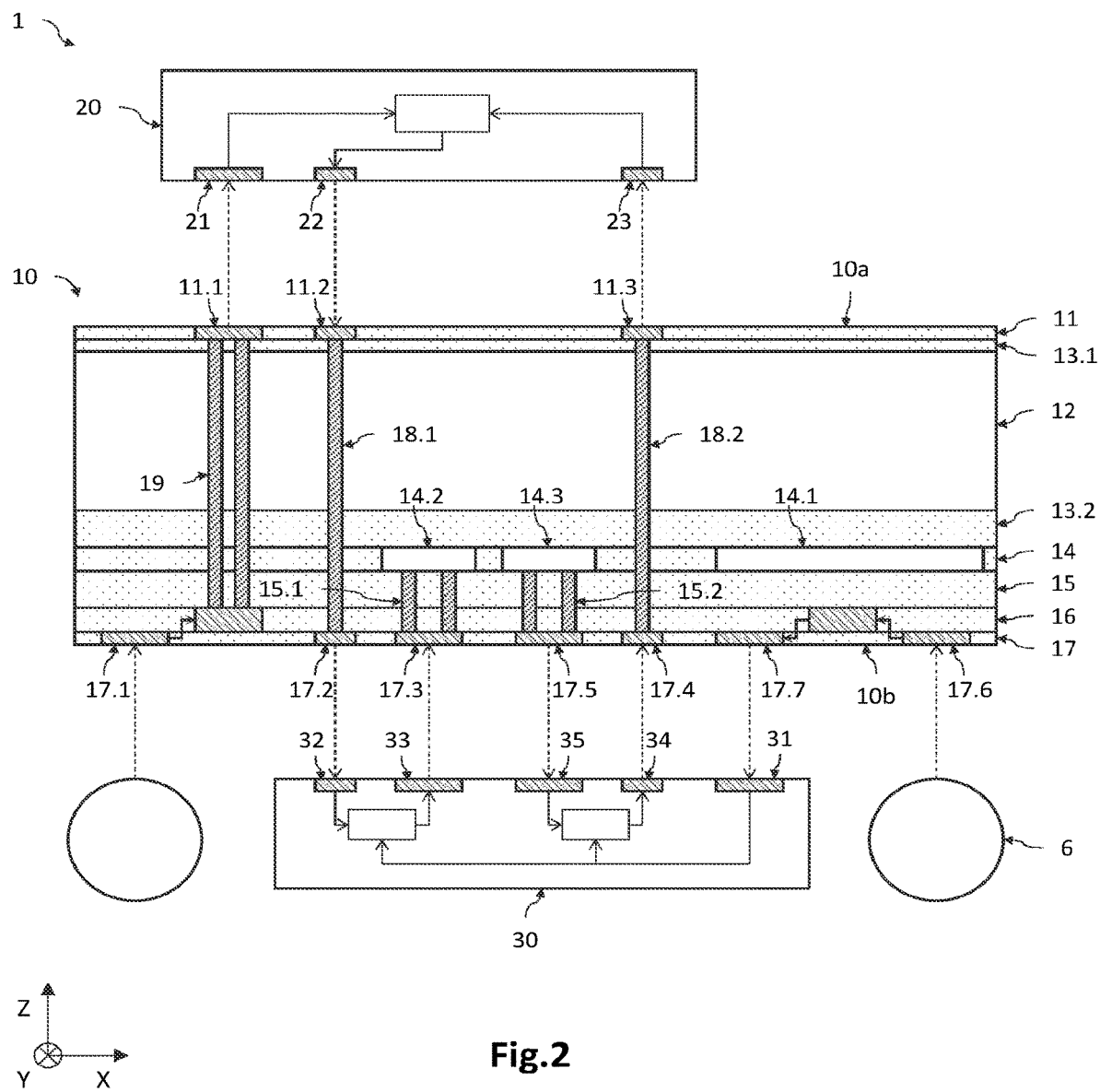
FIG. 2 is a detailed, schematic and partial cross-sectional view of the optoelectronic device illustrated in FIG. 1.
Figure 3A:
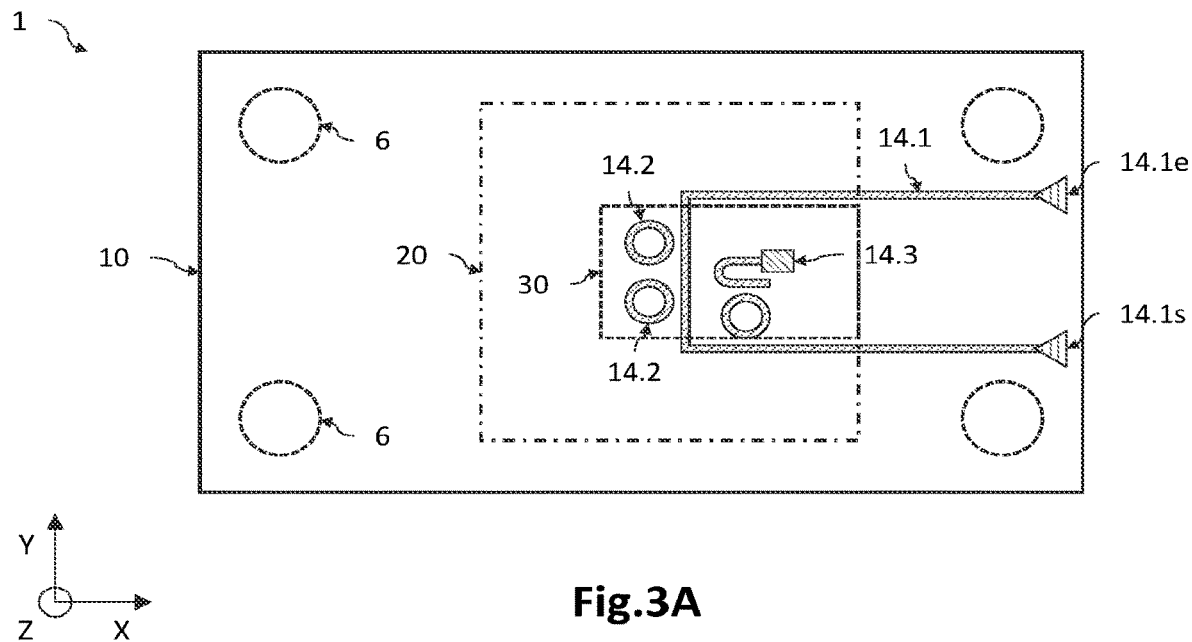
FIGS. 3A and 3B are schematic and partial plan views of various parts of the optoelectronic device illustrated in FIG. 1, showing the photonic circuit (FIG. 3A) and the conductive portions (FIG. 3B) in more detail.
Figure 3B:
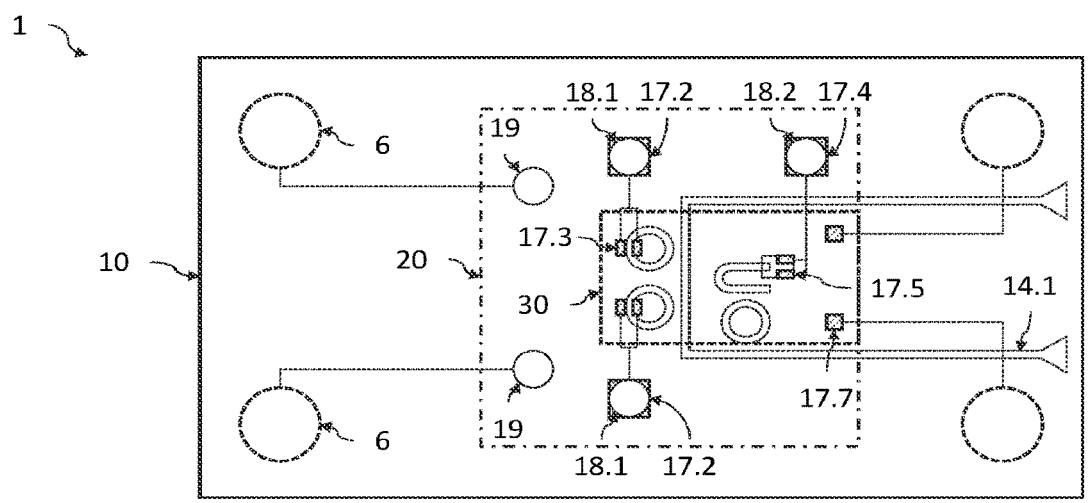

FIG. 1 is a schematic and partial cross-sectional view of an optoelectronic device 1 according to one embodiment. FIG. 2 is a detailed view of the optoelectronic device 1 illustrated in FIG. 1 (in which only one microelectronic chip 20 is illustrated), and FIGS. 3A and 3B are plan views of various parts of the optoelectronic device 1 illustrated in FIG. 2.

In general, the optoelectronic device 1 comprises microelectronic chips 20, 30 that are joined and connected to one another by way of a photonic interposer 10, and in this case at least one first microelectronic chip 20 connected to at least one second microelectronic chip, called electro-optical conversion chip 30. The optoelectronic device 1 may be intended for high-performance computing, or even be used in the field of Ethernet switches for datacom transmission applications between devices using optical fibers.

A direct orthogonal three-dimensional coordinate system XYZ is defined here and for the remainder of the description, in which the X- and Y-axes form a plane parallel to the main plane of the photonic interposer 10, and in which the +Z direction is oriented from the conversion chip 30 to the microelectronic chip 20. In the remainder of the description, the terms "lower" and "upper" are understood to relate to positions of increasing distance from the conversion chip 30 in the +Z direction.

The photonic interposer 10 is a one-piece device to which multiple microelectronic chips 20, 30 are mechanically joined, and which provides the electrical connection between the microelectronic chips 20, 30. It is said to be photonic and active since it comprises a photonic circuit 14.1 containing at least one optical component, such as an optical modulator (for example based on a Mach-Zehnder interferometer or a resonant ring), a tunable optical filter or a photodiode. Finally, it is a silicon interposer since it is produced based on silicon. In other words, it is made mostly of silicon or of a material containing silicon. (e.g. SOI)

Among the microelectronic chips, the optoelectronic device 1 comprises at least a first microelectronic chip 20 intended to transmit or receive an electrical signal to or from the second electro-optical conversion microelectronic chip 30. This microelectronic chip 20 is called host chip, and may be a microprocessor, a high bandwidth memory (HBM), a programmable logic circuit (FPGA), an ASIC application-specific circuit or the like. The microelectronic chip 30 is electrically connected to the active optical component 14.2, and therefore also to the first microelectronic chip 20. In this example, the photonic interposer 10 in this case comprises a photonic circuit 14.1 containing an optical modulator 14.2 and a photodiode 14.3, these two optical components in this case being connected to the same conversion chip 30.

The photonic interposer 10 is therefore a one-piece device having a first face, called upper face 10a, and a second, opposing face, called lower face 10b. The upper face 10a and lower face 10b each have a planar surface allowing the mechanical joining of the microelectronic chips 20, 30.

It is formed of a stack of layers made mostly of silicon or of a material containing silicon. In this example, it is in particular produced from an SOI (silicon on insulator) substrate. It thus comprises, from top to bottom:
- an upper interconnect layer 11, which defines the upper face 10a and by way of which the microelectronic chip 20 is joined and connected to the photonic interposer 10;
- a dielectric layer 13.1, preferably produced based on an oxide, nitride or silicon oxynitride;
- a thick silicon layer 12,
- a dielectric layer 13.2, in this case made of a silicon oxide (BOX, for buried oxide),
- an optical layer 14 containing the photonic circuit 14.1 formed of at least one integrated waveguide, and comprising at least one active optical component (in this case an optical modulator 14.2 and a photodiode 14.3);
- a lower dielectric layer 15, preferably produced based on an oxide, nitride or silicon oxynitride;
- an electrical redistribution layer 16, containing conductive vias and conductive lines;
- a lower interconnect layer 17, formed of metal pads, which defines the lower face 10b and by way of which the conversion chip 30 is joined and connected to the photonic interposer 10.

In this example, the photonic interposer 10 comprises the redistribution layer 16 situated close to the lower face 10b. It may also comprise a redistribution layer situated close to the upper face 10a, between the upper interconnect layer 11 and the thick layer 12, or even integrated into the upper interconnect layer 11. As another variant, it might not comprise any redistribution layer, in particular when the microelectronic chips 20, 30 are not supplied with electric power by way of the photonic interposer 10, but by way of a wired connection (wire bonding).

The upper interconnect layer 11 in this case extends over the dielectric layer 13.1, which is itself in contact with the thick silicon layer 12, and defines the upper face 10a. It is formed in this case of distinct conductive portions, made of at least one electrically conductive material, for example gold, titanium, copper, etc., separated from one another in the XY plane by a dielectric material, for example an oxide, nitride or silicon oxynitride. Other dielectric materials may be used, such as a hafnium oxide or aluminum oxide, or even an aluminum nitride, inter alia. The upper face 10a is in this case formed by the conductive portions and by the dielectric material.

The conductive portions are in this case conductive power supply portions 11.1 intended to provide the supply of electric power to the microelectronic chip 20 situated on the upper face 10a, and at least one conductive control portion 11.2, 11.3 intended to provide the electrical connection between the microelectronic chip 20 and the conversion chip 30. In this example, purely by way of illustration, the upper interconnect layer 11 comprises:
- first conductive power supply portions 11.1 for supplying power to the microelectronic chip 20,
- first upper conductive control portions 11.2, connected to the conversion chip 30 in this case by a through-silicon via 18.1 and by the portions 17.2 and 32, and
- second upper conductive control portions 11.3, connected to the conversion chip 30 in this case by a through-silicon via 18.2 and by the portions 11.3 and 34.

The photonic interposer 10 comprises a lower interconnect layer 17, which extends in this case in contact with the electrical redistribution layer 16, and defines the lower face 10b. It is formed in this case of distinct conductive portions, made of at least one electrically conductive material, for example gold, titanium, copper, etc., separated from one another by a dielectric material, for example an oxide, nitride or silicon oxynitride or the like. The lower face 10b is therefore formed by the conductive portions and by the dielectric material.

The conductive portions are in this case conductive power supply portions intended to provide the supply of electric power to the microelectronic chip 20 situated on the upper face 10a, conductive power supply portions intended to provide the supply of electric power to the conversion chip 30 situated on the lower face 10b, at least one conductive control portion and conductive intermediate portions intended to provide the electrical connection between the microelectronic chip 20 and the optical component via the conversion chip 30. In this example, purely by way of illustration, the lower interconnect layer 17 comprises:
- first lower conductive power supply portions 17.1 for supplying power to the microelectronic chip 20,
- second lower conductive power supply portions 17.6 and second lower conductive intermediate portions 17.7 for supplying electric power to the conversion chip 30,
- first lower conductive control portions 17.2 and first lower conductive intermediate portions 17.3 for the connection between the microelectronic chip 20 and the optical modulator 14.2, via the conversion chip 30;
- second lower conductive control portions 17.4 and second lower conductive intermediate portions 17.5 for the connection between the microelectronic chip 20 and the photodiode 14.3, via the conversion chip 30.

The photonic interposer 10 comprises the thick silicon layer 12, which in this case extends underneath and in contact with the upper interconnect layer 11. This layer originates from an SOI substrate. It contributes to providing the mechanical strength of the optoelectronic device 1, in this case with the microelectronic chip 20 and the encapsulating layer 5, as described below. It may have a thickness of preferably less than 200 μm, for example of the order of around one hundred microns, for example equal to around 100 μm. A dielectric layer 13.1, made for example of a silicon oxide, provides the electrical insulation between the upper interconnect layer 11 and the thick silicon layer 12.

The photonic interposer 10 comprises the dielectric layer 13.2, which in this case extends underneath and in contact with the thick silicon layer 12. It is made in this case of a silicon oxide, and corresponds to the buried oxide layer (BOX) of the SOI substrate. It contributes to forming the sleeve with a low refractive index that surrounds the photonic circuit 14.1.

The photonic interposer 10 comprises the optical layer 14, which in this case extends underneath and in contact with the dielectric layer 13.2. It is said to be optical in the sense that it comprises the photonic circuit 14.1, which is formed by one or more waveguides. The waveguides are in this case made of silicon, from the thin silicon layer of the SOI substrate. As a variant, they may be made of a material with a high refractive index and that is transparent to the wavelength of the optical signal intended to flow in the photonic circuit 14.1, such as for example a silicon nitride or the like. The optical layer 14 is formed by the waveguides, which may have a constant thickness, and for example a dielectric material with a low refractive index, for example a silicon oxide. Moreover, the photonic circuit 14.1 comprises at least one active optical component such as an optical modulator, an optical filter, or a photodiode. In this example, it comprises an optical modulator 14.2 and a photodiode 14.3.

The photonic interposer 10 then comprises the lower dielectric layer 15, which in this case extends underneath and in contact with the optical layer 14. It is made in this case of a dielectric material, for example of a silicon oxide or the like. It contributes to forming the sleeve with a low refractive index that surrounds the photonic circuit 14.1.

The photonic interposer 10 then comprises one or more redistribution layers 16 (i.e. BEOL routing layers), which in this case extend underneath and in contact with the lower dielectric layer 15. It comprises conductive vias and conductive lines in order to at least provide electrical redistribution between power supply portions 17.1, 17.6, 17.7 and through-silicon vias 19 (TSV) in order in this case to provide the supply of electric power (or even also the transmission of electric data) to the microelectronic chip 20 and the conversion chip 30. It should be noted that the interposer may also comprise an upper redistribution layer situated between the interconnect layer 11 and the dielectric layer 13.1. Moreover, such a redistribution layer 16 may be absent when the photonic interposer 10 does not contribute to supplying electric power to the microelectronic chips 20, 30.

In addition, the photonic interposer 10 comprises at least one TSV called control TSV 18, and in this case at least two control TSVs, one 18.1 of which provides the electrical connection between the first upper conductive control portion 11.2 (intended to be connected to the microelectronic chip 20) and the first lower conductive control portion 17.2 (intended to be connected to the conversion chip 30), and the other 18.2 of which provides the electrical connection between the second upper conductive control portion 11.3 (intended to be connected to the microelectronic chip 20) and the second lower conductive control portion 17.4 (intended to be connected to the conversion chip 30). These control TSVs 18 extend vertically, along the Z-axis, over substantially the entire thickness of the photonic interposer 10, and therefore pass through at least the dielectric layer 13.1, the thick silicon layer 12, the dielectric layer 13.2, the optical layer 14 and the lower dielectric layer 15. They may have a height of the order of around 100 µm and a diameter of around 10 µm.

It is apparent from this that the control TSVs 18 provide a vertical and direct electrical connection between two microelectronic chips 20, 30 situated facing one another on either side of the photonic interposer 10, in this case between the microelectronic chip 20 and the conversion chip 30, without involving an intermediate conductive line situated for example in a redistribution layer 16. As a result, the first upper and lower control portions 11.2 and 17.2, respectively, are situated perpendicular to one another, just as is the case here for the second upper and lower control portions 11.3 and 17.4, respectively. Therefore, the microelectronic chip 20 and conversion chip 30 are at least partially situated vertical (plumb) to one another. This thus reduces the distance between these microelectronic chips 20, 30, which may be of the order of around one hundred microns, and no longer of the order of several hundred microns or of a millimeter as in the example from the prior art when the microelectronic chips are arranged next to one another in the XY plane.

The photonic interposer 10 may comprise TSVs called power supply TSVs 19, which contribute to providing the electrical connection between the first upper and lower power supply portions 11.1 and 17.1, respectively, for supplying electric power to the microelectronic chip 20. These TSVs 19 extend vertically, along the Z-axis, over at least part of the thickness of the photonic interposer 10, and therefore in this case pass through the thick silicon layer 12, the dielectric layer 13.2, the optical layer 14 and the lower dielectric layer 15. Conductive vias and conductive lines of the redistribution layer 16 provide the electrical connection of the power supply TSVs 19 to the lower power supply portions 11.1.

Moreover, the photonic interposer 10 rests on a power supply support 2 by way of power supply pads 6, for example in this case conductive balls made of a ductile material, such as for example tin-based alloys such as SnAg. The first lower power supply portions 17.1 are in contact with first conductive balls 6 (for supplying electric power to the microelectronic chip 20), and the second lower power supply portions 17.6 are in contact with second conductive balls 6 (for supplying electric power to the conversion chip 30). The conductive balls 6 may have a diameter greater than the thickness of the one or more chips 30, for example of the order of 300 µm, thus allowing the optoelectronic device 1 to be transferred onto the power supply support 2. The power supply support 2 may be a printed circuit board PCB. It may also transmit electric data to the chips 20 and 30.

The optoelectronic device 1 in this case comprises at least one microelectronic chip 20, mechanically joined and electrically connected to the photonic interposer 10 by the upper face 10a thereof. The microelectronic chip 20 may in this case be intended to communicate with the optical modulator 14.2 and the photodiode 14.3 by way of the conversion chip 30. It sends and receives information to and from the conversion chip 30; for example, it may send a control signal intended for the optical modulator 14.2, and receive a measurement signal coming from the photodiode 14.3. The microelectronic chip 20 in this case comprises a CMOS electronic integrated circuit EIC, and comprises active electronic components such as diodes, transistors, capacitors, resistors, etc. In this case, it comprises an interconnect layer, comprising conductive portions, including conductive power supply portions 21, at least one first conductive control portion 22 (for communicating with the optical modulator 14.2) and at least one second conductive control portion 23 (for communicating with the photodiode 14.3).

The one or more first microelectronic chips 20 may comprise a thermal cooling device 4, formed in this case by fins made of a thermally conductive material, which extend from the upper face of the microelectronic chips 20. This device makes it possible to effectively cool the microelectronic chips 20. It should be noted in this case that the active optical components 14.2, 14.3 are situated close to the lower face 10b of the photonic interposer 10, and are therefore at a distance from the microelectronic chips 20. They are therefore not or only slightly impacted by the heating of the microelectronic chips 20, thereby making it possible to maintain their performance.

Moreover, the microelectronic chips 20 may be kept joined to the photonic interposer 10 by an encapsulating layer 5, for example made of silicone or epoxy resin, which covers the upper face 10a of the photonic interposer 10, extends between the interconnect pads 24, and extends in contact with the microelectronic chips 20 in the XY plane. The interconnect pads 24, like the interconnect pads 36, may be arranged periodically with a pitch less than or equal to around 40 µm.

The optoelectronic device 1 in this case comprises at least one electro-optical conversion chip 30, mechanically joined and electrically connected to the photonic interposer 10 by the lower face 10b thereof. The conversion chip 30 in this case provides the electrical or electronic interface between the microelectronic chip 20, on the one hand, and the optical modulator 14.2 and the photodiode 14.3, on the other hand. It exchanges data (electrical signals) with the chip 20 (for example it processes the information received from the chip 20 in order to store it temporarily, orient it, reformat it and then transmit it to the optical modulator 14.2 and/or the photodiode 14.3. The same applies for the information received from the optical modulator 14.2 and/or from the photodiode 14.3 to be transmitted to the chip 20). The conversion chip 30 in this case comprises a (for example CMOS) electronic integrated circuit, and comprises active electronic components such as diodes, transistors, capacitors, resistors, etc. More specifically, it comprises a CMOS transmitter for driving the optical modulator 14.2 at a rate of several tens of Gb/s, for example 20 to 50 Gb/s, or even more. It also comprises a CMOS receiver (for example a transimpedance amplifier TIA) for adapting the electrical signal received from the photodiode 14.3 and transmitting it to the microelectronic chip 20. In this case, it comprises an interconnect layer, comprising conductive portions, including conductive power supply portions 31, first conductive control and intermediate portions 32 and 33, respectively, for communicating with the microelectronic chip 20 and the optical modulator 14.2, and second conductive control and intermediate portions 34 and 35, respectively, for communicating with the microelectronic chip 20 and the photodiode 14.3.

The photonic circuit 14.1 comprises an optical input 14.1*e* and an optical output 14.1*s* designed to receive and to transmit the optical signal to external waveguides, for example optical fibers 3. These may be arranged so as to transmit the optical signal through the slice of the photonic interposer 10, or be arranged vertically or inclined with respect to the XY plane. The photonic interposer 10 may comprise notches for positioning and aligning the optical fibers with respect to the optical input and output, as described in particular in document FR3075991A1.

By way of example, the microelectronic chips 20 may have a thickness of the order of 100 μm, and the interconnect pads 24 between the photonic interposer 10 and the microelectronic chips 20 may have a thickness of the order of 30 μm. The photonic interposer 10 may have a thickness of the order of 100 μm between its upper face 10*a* and lower face 10*b*, and the power supply balls 6 may have a thickness of the order of 250 μm.

During operation, the microelectronic chip 20 is supplied with electric power by way of the photonic interposer 10. The electric supply current flows through the power supply balls 6, the lower conductive power supply portions 17.1, the conductive lines of the redistribution layer 16, the power supply TSVs 19, the upper conductive power supply portions 11.1, and the conductive power supply portions 21 for supplying power to the microelectronic chip 20.

The conversion chip 30 is supplied with electric power by way of the photonic interposer 10. The electric supply current flows through the power supply balls 6, the second lower conductive power supply portions 17.6, the conductive lines of the redistribution layer 16, the second lower conductive intermediate portions 17.7, and the conductive power supply portions 31 for supplying power to the conversion chip 30.

An optical signal is transmitted in the photonic circuit 14.1 by an external optical fiber, and flows between the input 14.1*e* and the output 14.1*s*. It is modulated by the optical modulator 14.2, which is controlled by the microelectronic chip 20. For this purpose, the microelectronic chip 20 emits an electrical signal in the direction of the conversion chip 30, which is transmitted by its first conductive control portion 22, the first upper conductive control portion 11.2, the control TSV 18.1, the first lower conductive control portion 17.2, and then by the first conductive control portion 32 of the conversion chip 30. The electrical signal is adapted by the microelectronic chip 20, and is then transmitted to the optical modulator 14.2 by the conductive intermediate portions 33, the lower conductive intermediate portions 17.3, and the conductive vias 15.1. The optical signal is then consequently modulated.

In addition, the microelectronic chip 20 receives an electrical signal representative of the signal detected by the photodiode 14.3. For this purpose, the photodiode 14.3 emits an electrical signal in the direction of the conversion chip 30, which flows through the conductive vias 15.2, the second lower conductive intermediate portions 17.5, and through the conductive intermediate portions 35 of the conversion chip 30. The latter adapts the electrical signal, and then transmits it to the microelectronic chip 20, which then flows through the second conductive control portion 34, the second lower conductive control portion 17.4, the control TSV 18.2, the second upper conductive control portion 11.3, and through the second conductive control portion 23 of the microelectronic chip 20.

Therefore, due to the fact that the microelectronic chip 20 and conversion chip 30 are situated on either side of the photonic interposer 10 and are connected directly to one another by at least one control TSV 18, the distance between these two microelectronic chips 20, 30 is reduced and may be of the order of around one hundred microns. This then makes it possible to reduce communication latency between the microelectronic chips, and to reduce electricity consumption and the thermal budget. In addition, this gives a space saving on the upper face 10*a* of the photonic interposer 10, which may be harnessed to connect more microelectronic chips 20, such as computing chips and memory chips. Moreover, the bandwidth between the microelectronic chips 20, 30 may be increased due to a reduction in parasitic effects linked to the propagation of high-frequency signals over longer distances. Finally, situating the active optical components close to the lower face 10*b* makes it possible to limit the negative impact on the performance thereof that may be brought about by the heating of the first microelectronic chips 20. In addition, the proximity between the optical components and the chip 30 is retained in the same way as in conventional architectures. The photonic interposer 10 may form an ONoC (optical network on chip) network on chip. Multiple photonic interposers may be connected to one another by way of fibers or optical guides.

FIGS. 4A to 4L are schematic and partial views illustrating various steps of a method for manufacturing an optoelectronic device 1 similar to the one illustrated in FIG. 2. The photonic interposer 10 is produced from an SOI substrate, and the optical layer 14 with the photonic circuit 14.1 is situated between the thick silicon layer 12 and the lower face 10*b*.

Figure 4A:
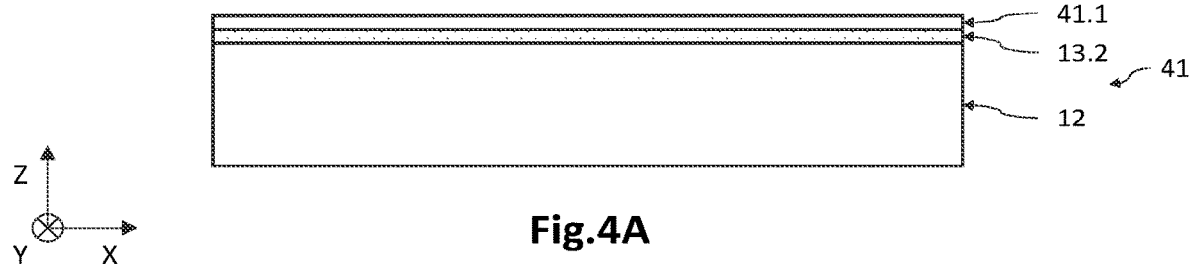
FIGS. 4A to 4L are schematic and partial cross-sectional views illustrating various steps of a method for manufacturing an optoelectronic device similar to the one illustrated in FIG. 1.

With reference to FIG. 4A, an SOI substrate 41 is provided. It is formed of a thick silicon layer 12, of a dielectric layer 13.2 (BOX) made of a silicon oxide intended to form the upper dielectric layer, and of a thin silicon layer 41.1. The thick silicon layer 12 may have a thickness of several hundred microns, for example of 725 μm.

Figure 4B:
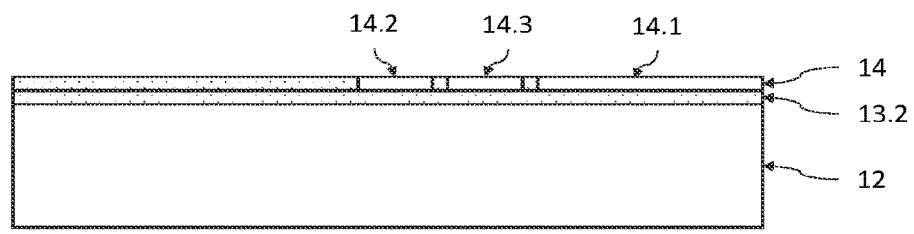

With reference to FIG. 4B, the optical layer 14 is then produced, in this case from the thin silicon layer 41.1, which contains the photonic circuit 14.1. The waveguides are made of silicon, and the active optical components are produced, for example in this case an optical modulator 14.2 (for example a ring resonator) and a photodiode 14.3. A dielectric material with a low refractive index, for example a silicon oxide, surrounds the photonic circuit 14.1 in the XY plane.

Figure 4C:
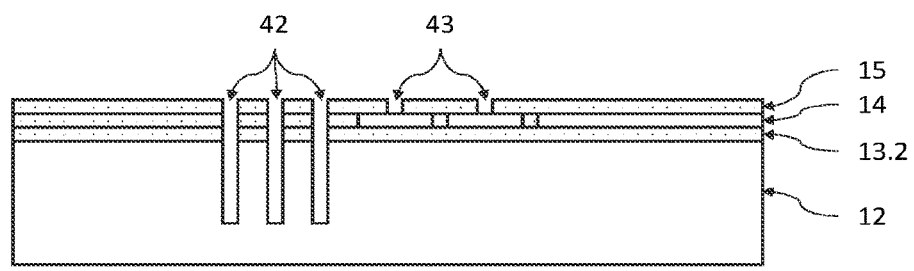

With reference to FIG. 4C, a dielectric layer with a low refractive index is produced through deposition on the optical layer 14. This dielectric layer forms the lower dielectric layer 15. Next, openings 43 that open out onto the active optical components are also produced, these openings 43 being intended for the subsequent production of the conductive vias. Blind openings 42 that are intended to subsequently form the TSVs are also produced through dry etching. These openings 42 extend through the dielectric layer 15, the optical layer 14 (into the dielectric material), into the dielectric layer 13.2, and extend over part of the thickness of the thick layer 12. They have a diameter of the order of 10 µm and a height of the order of 100 µm.

Figure 4D:
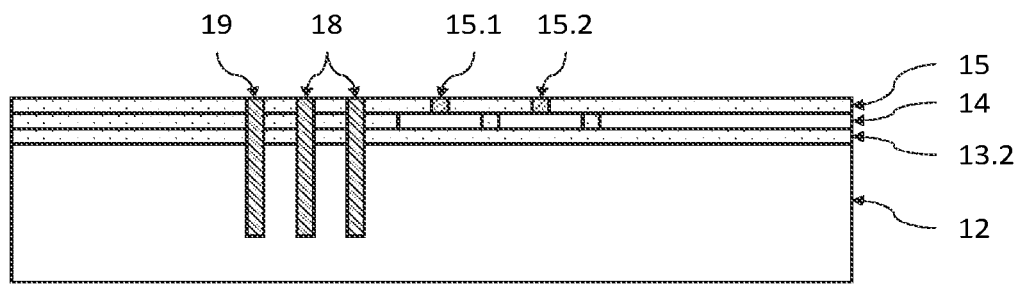

With reference to FIG. 4D, the control TSVs 18 and the power supply TSVs 19, along with the conductive vias 15.1, 15.2, are produced by depositing at least one metal material in the various openings. The one or more metal materials may be for example tungsten, copper, aluminum or the like. In practice, the openings 43 are produced, and then the conductive vias 15.1 and 15.2 are produced. Next, the openings 42 are produced, and then the TSVs 18 and 19 are produced.

Figure 4E:
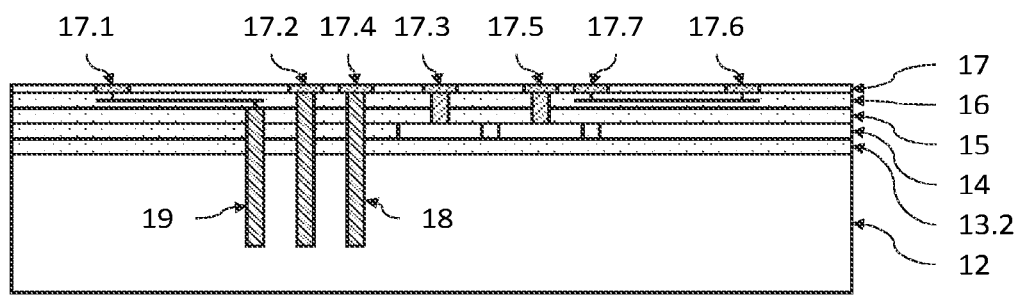

With reference to FIG. 4E, the redistribution layer 16 is produced, which comprises conductive vias and conductive lines extending into a dielectric material such as a silicon oxide. This is a BEOL (back end of line) layer. The power supply TSVs 19 are flush with the redistribution layer 16 without passing through it, while the control TSVs 18 and the conductive vias of the active optical components pass through it.

The lower interconnect layer 17 is then produced. This comprises conductive portions that are surrounded in the XY plane by a dielectric material such as a silicon oxide. The conductive portions are in this case the first lower power supply portions 17.1 (connected to the power supply TSVs 19 by the conductive lines of the redistribution layer 16), the first conductive control portions 17.2, 17.4 (in contact with the control TSVs 18), first conductive intermediate portions 17.3, 17.5 (in contact with the conductive vias), and second conductive power supply portions 17.6, 17.7 (connected to one another by the conductive lines of the redistribution layer 16).

Figure 4F:
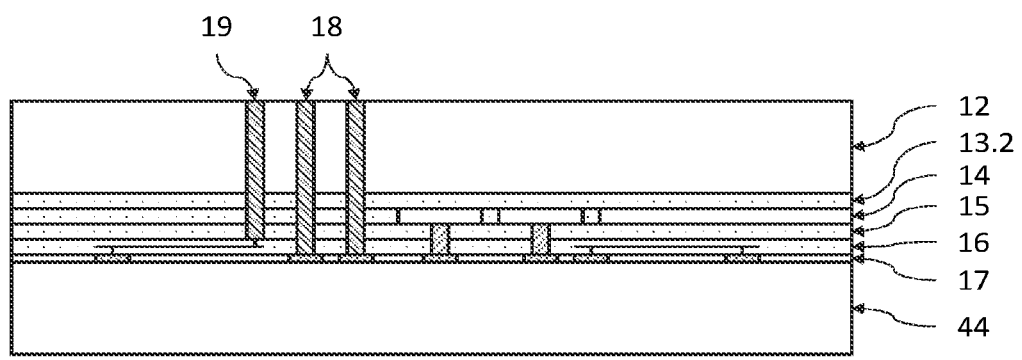

With reference to FIG. 4F, a handle substrate 44 is joined to the interconnect layer 17, in this case through direct bonding, and the structure that is obtained is flipped. The thickness of the thick layer 12 is then reduced through mechanical abrasion and selective plasma etching, so as to open up the TSVs 18, 19. The thick layer 12 may then have a thickness of the order of around one hundred microns.

Figure 4G:
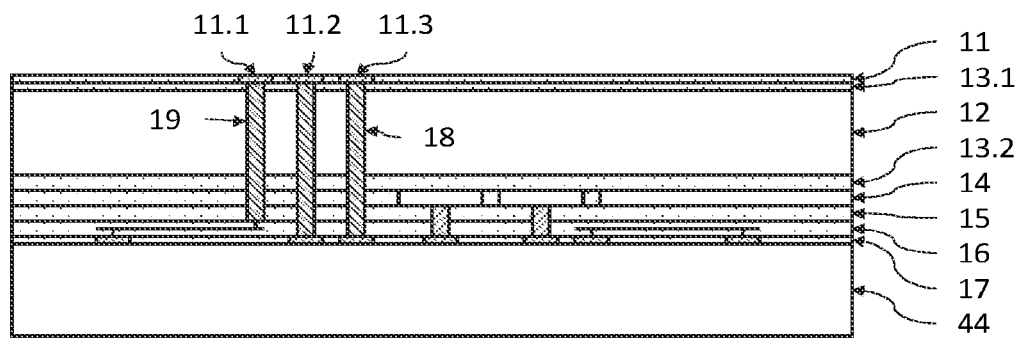

With reference to FIG. 4G, the interconnect layer 11 is produced, which comprises conductive portions in contact with the TSVs 18, 19 that are insulated from the thick layer 12 by a dielectric layer 13.1, and surrounded in the XY plane by a dielectric material. The conductive portions are in this case conductive power supply portions 11.1 (in contact with the power supply TSVs 19) and conductive control portions 11.2, 11.3 (in contact with the control TSVs 18).

Figure 4H:
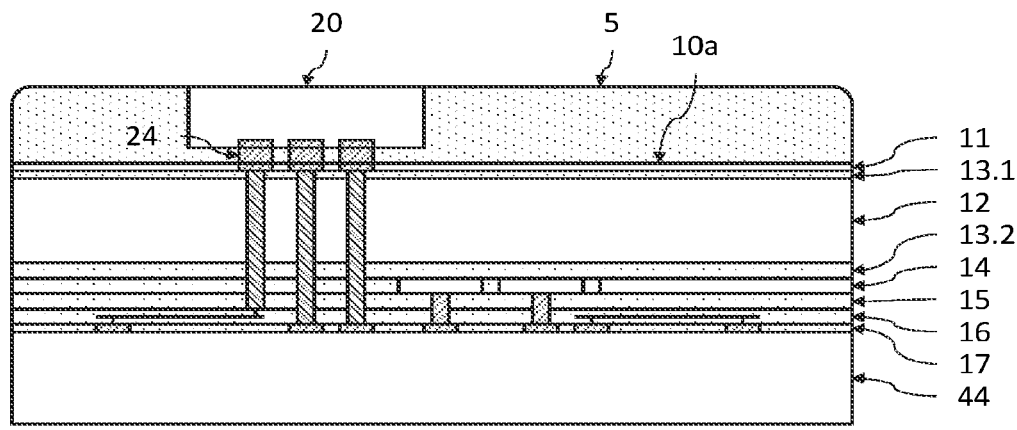

With reference to FIG. 4H, interconnect pads 24, also called copper pillars, are produced (physical vapor deposition (PVD) of a sublayer of Ti/Cu, lithography to define the size of the pads (diameter of the order of 10 to 500 µm and with a minimum pitch between the pads of 20 µm), electrolysis of Cu/Ni/SnAg and removal of the resin (stripping), etching of the Ti/Cu sublayer around the pads, and then thermal annealing) or UBM (for under bumping metallization) formed of a Cu/Ni/Au stack, in contact with the conductive portions of the interconnect layer 11. The microelectronic chip 20 is then placed on and joined to the interposer 10 through collective soldering. It will be noted that joining the handle substrate 44 through direct bonding makes it possible to withstand a soldering joining temperature between the microelectronic chip 20 and the interconnect pads 24 that may be of the order of 260° C.

An encapsulating layer 5 (or molding) is then deposited, such that it extends over the upper face 10a and surrounds the microelectronic chip 20 and the interconnect pads 24 in the XY plane, thus bolstering the mechanical strength of the microelectronic chip 20 on the photonic interposer 10. The encapsulating layer 5 may be made of an epoxy resin or the like.

Figure 4I:
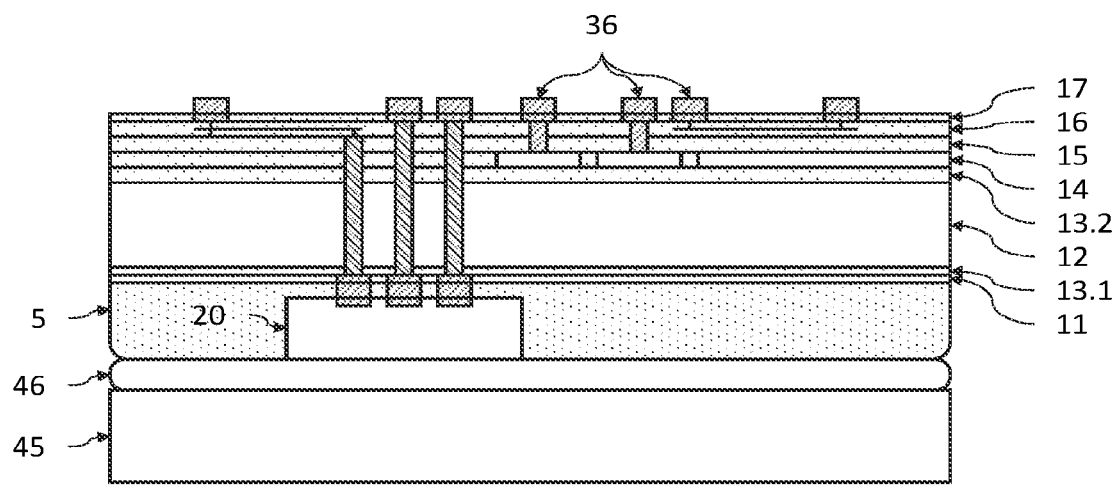

With reference to FIG. 4I, another handle substrate 45 is joined to the free planar face formed by the microelectronic chip 20 and the encapsulating layer 5, in this case by way of a polymer adhesive 46. The structure thus obtained is flipped, and the handle substrate 44 is removed through abrasion. The face of the interconnect layer 17 is freed up, and the interconnect pads 36 are produced in contact with the various conductive portions called UBM and formed of the Cu/Ni/Au stack.

Figure 4J:
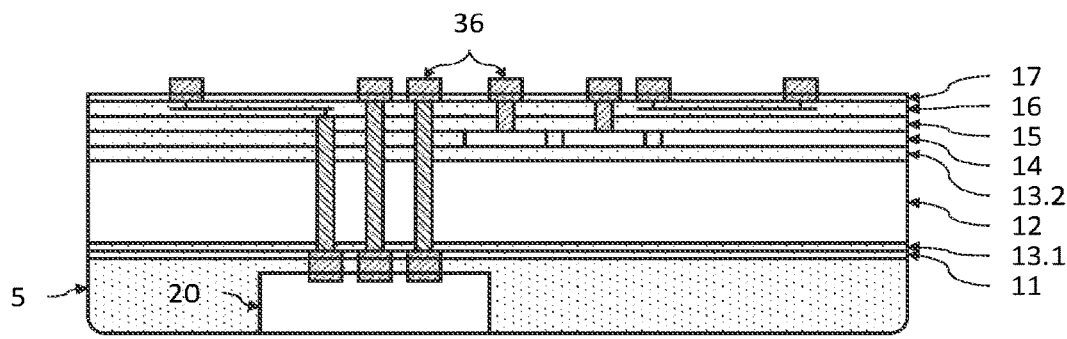

With reference to FIG. 4J, the handle substrate 45 and the adhesive layer 46 are removed. The structure thus obtained may be manipulated despite the reduced thickness of the photonic interposer 10, in this case by virtue of the thickness and the mechanical strength of the stack formed of the photonic interposer 10, the microelectronic chip 20 and the encapsulating layer 5.

Figure 4K:
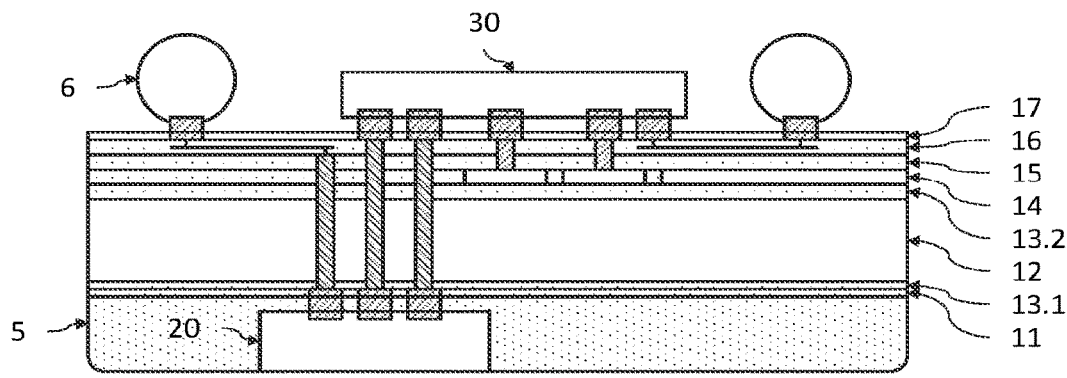

With reference to FIG. 4K, the conversion chip 30 and the power supply balls 6 are joined to the various interconnect pads through ball placement or screen printing.

Figure 4L:
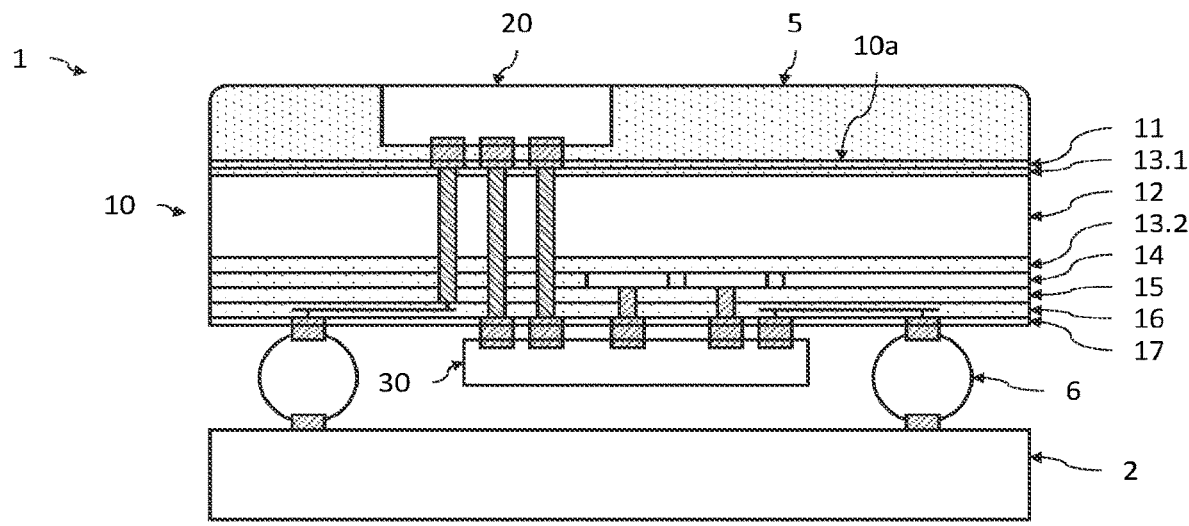

With reference to FIG. 4L, the structure thus obtained is flipped, and is then joined to a power supply support 2 by way of the power supply balls 6. A cooling device may be fastened to the microelectronic chip 20.

This thus gives an optoelectronic device 1 formed of an active photonic interposer 10 to which at least one microelectronic chip 20 and at least one conversion chip 30 are joined and connected. The microelectronic chip 20 and the conversion chip 30 are directly connected to one another by control TSVs, thus reducing the distance between them, thereby improving the performance of the optoelectronic device 1 (reduced latency time, reduced electricity consumption, increased bandwidth, etc.). In addition, the microelectronic chip 20 is situated on the upper face 10a of the photonic interposer 10, and the photonic circuit 14.1 is situated close to the lower face 10b. This thus limits the drop in performance of the active optical components that may be brought about by the heating of the microelectronic chip 20. Moreover, the number of microelectronic chips (computing, memory, etc.) situated on the upper face 10a may be increased.

Particular embodiments have just been described. Various modifications and variants will be obvious to anyone skilled in the art. As indicated above, the photonic interposer 10 may comprise one or more redistribution layers 16 between the upper interconnect layer 11 and the thick silicon layer 12. It might also not comprise any redistribution layers if the chips are supplied with power through a wired connection (wire bonding).

The invention claimed is:

1. An optoelectronic device, comprising:
a photonic interposer, having an upper face and an opposite, lower face, produced based on silicon, and comprising:
   a photonic circuit containing at least one active optical component, and
   an upper interconnect layer, defining the upper face, and comprising at least one first upper conductive control portion;
at least one first microelectronic chip, joined to the upper face and connected to the first upper conductive control portion, intended to transmit or receive an electrical signal to or from a second microelectronic chip;
the second microelectronic chip, called electro-optical conversion chip, joined and connected to the photonic interposer, which provides the electrical connection of the second microelectronic chip to the active optical component, on the one hand, and to the first microelectronic chip, on the other hand;
the photonic interposer comprising:
   a lower interconnect layer, defining the lower face, comprising at least one first lower conductive control portion, and first lower conductive intermediate portions;
   at least one through-silicon via directly connecting the first upper conductive control portion to the first lower conductive control portion;
   conductive vias connecting the first lower conductive intermediate portions to the active optical component;
the second microelectronic chip being joined to the lower face, and being connected to the first lower conductive control portion, on the one hand, and to the first lower conductive intermediate portions, on the other hand.

2. The optoelectronic device as claimed in claim 1, wherein the photonic interposer comprises a stack of layers, including a thick silicon layer and an optical layer in which the photonic circuit is formed, the thick layer being situated towards the upper face and the optical layer being situated towards the lower face.

3. The optoelectronic device as claimed in claim 2, wherein the photonic interposer comprises a dielectric layer made of a silicon oxide, and situated between and in contact with the thick layer and the optical layer.

4. The optoelectronic device as claimed in claim 1, wherein the photonic interposer comprises first lower conductive power supply portions situated at the lower face and connected to an electric power source of the first microelectronic chip, and upper conductive power supply portions situated at the upper face and connected to the first lower conductive power supply portions by through-silicon vias, and the first microelectronic chip comprises conductive power supply portions connected to the upper conductive power supply portions.

5. The optoelectronic device as claimed in claim 1, wherein the photonic interposer comprises second lower conductive power supply portions situated at the lower face and connected to an electric power source of the second microelectronic chip, and second conductive intermediate power supply portions situated at the lower face and connected to the second lower conductive power supply portions, and the second microelectronic chip comprises conductive power supply portions connected to the second conductive intermediate power supply portions.

6. The optoelectronic device as claimed in claim 5, wherein the photonic interposer comprises one or more redistribution layers, comprising conductive lines and conductive vias, situated between and in contact with a lower dielectric layer and the lower interconnect layer, the redistribution layer providing the electrical connection between the second conductive intermediate power supply portions and the second lower conductive power supply portions.

7. The optoelectronic device as claimed in claim 1, wherein the active optical component of the photonic circuit is chosen from an optical modulator, an optical filter and a photodiode.

8. The optoelectronic device as claimed in claim 1, comprising external waveguides optically coupled to the photonic circuit of the photonic interposer.

9. The optoelectronic device as claimed in claim 1, comprising an encapsulating layer extending over the upper face of the photonic interposer and coming into contact with the first microelectronic chip.

10. The optoelectronic device as claimed in claim 1, wherein the photonic interposer has a thickness, between its lower and upper faces, of less than or equal to 200 µm.

11. The optoelectronic device as claimed in claim 1, comprising a plurality of through-silicon vias directly connecting the first upper conductive control portion to the first lower conductive control portion, the first upper conductive control portions being connected to the first microelectronic chip by upper interconnect pads, and the first lower conductive control portions being connected to the second microelectronic chip by lower interconnect pads, the upper interconnect pads and the lower interconnect pads being arranged with a pitch less than or equal to 40 µm.

12. The optoelectronic device as claimed in claim 1, wherein the second microelectronic chip is joined to the photonic interposer by way of lower interconnect pads, the latter being in contact with the second microelectronic chip and the photonic interposer.

13. The optoelectronic device as claimed in claim 1, wherein the photonic interposer rests on a power supply support by way of power supply pads whose thickness is greater than that of the second microelectronic chip.

14. A method for manufacturing an optoelectronic device as claimed in claim 1, comprising the following steps:
providing an SOI substrate, comprising a thick silicon layer, a dielectric layer made of a silicon oxide, and a thin silicon layer;
producing an optical layer from the thin silicon layer;
producing through-silicon vias, in blind openings extending through the optical layer, the dielectric layer, and through part of the thick silicon layer;
producing a lower dielectric layer extending over and in contact with the optical layer;
producing the lower interconnect layer on a lower dielectric layer;
joining a first handle substrate through direct bonding to the lower interconnect layer;
thinning the thick silicon layer, so as to open out the through-silicon vias;
producing the upper interconnect layer, in conductive portions in contact with the through-silicon vias;
removing the first handle substrate.

15. The manufacturing method as claimed in claim 14, comprising the following steps:
before removing the first handle substrate, joining the first microelectronic chip to the upper interconnect layer, and depositing an encapsulating layer that covers the upper face;

joining a second handle substrate to a free planar face formed by the first microelectronic chip and the encapsulating layer, and removing the first handle substrate;
removing the second handle substrate;
joining the second microelectronic chip.

* * * * *